March 7, 1961  B. LERNER  2,973,697
METHOD OF AND APPARATUS FOR PRODUCING THUMB-NOTCHED
BAG LENGTHS, EACH NOTCH BEING CONFINED
TO ONE WALL OF EACH BAG LENGTH
Filed May 22, 1956
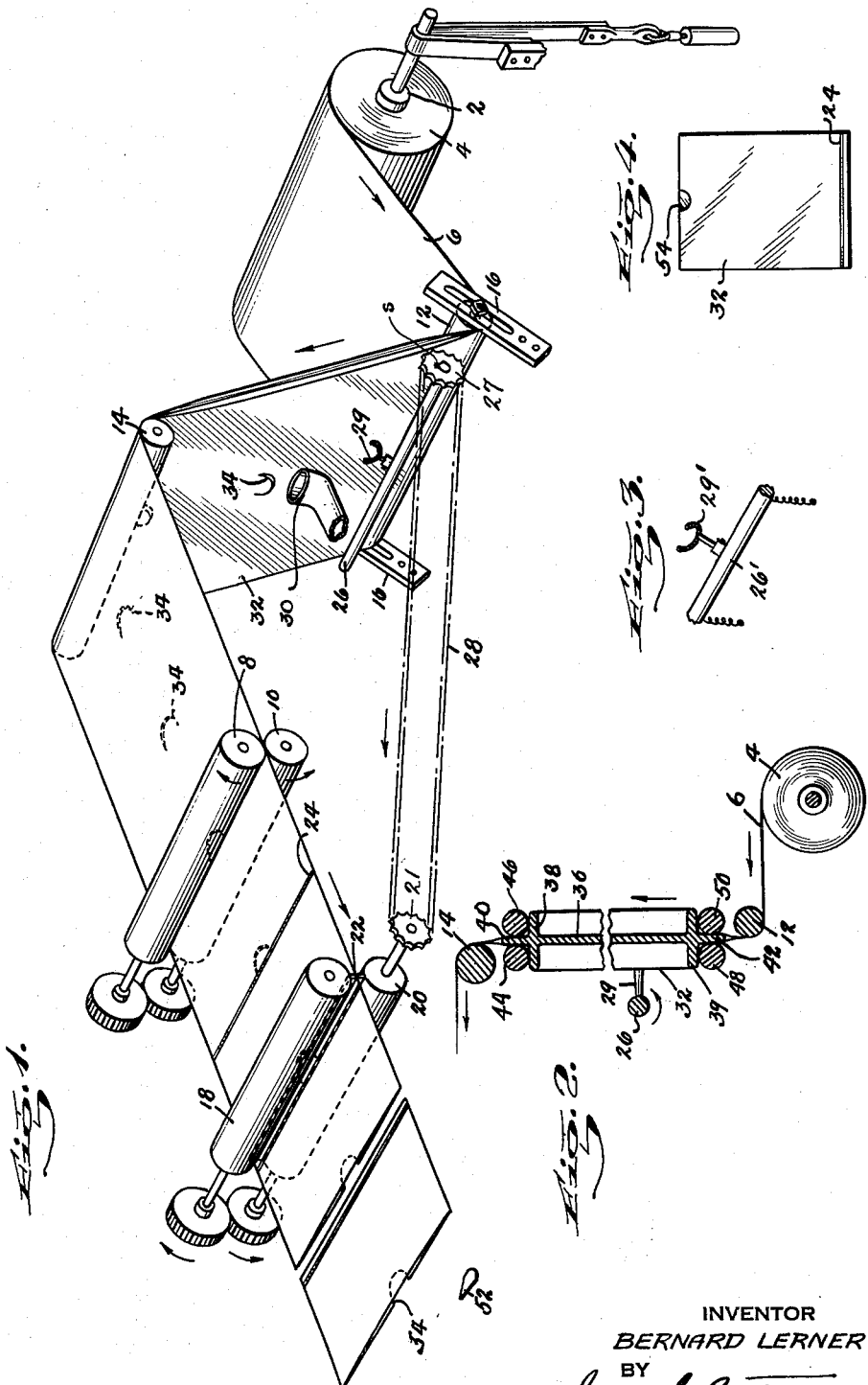
INVENTOR
BERNARD LERNER
BY
James G. Bethell
ATTORNEY United States Patent Office 2,973,697
Patented Mar. 7, 1961

2,973,697

METHOD OF AND APPARATUS FOR PRODUCING THUMB-NOTCHED BAG LENGTHS, EACH NOTCH BEING CONFINED TO ONE WALL OF EACH BAG LENGTH

Bernard Lerner, Bayside, N.Y., assignor to Custom-Made Paper Bag Co., Inc., Long Island City, N.Y., a corporation of New York Filed May 22, 1956, Ser. No. 586,594

3 Claims. (Cl. 93—8)

My invention relates to an improved method of and apparatus for forming thumb notches successively in a continuous length of advancing thin tubing—polyethylene, for example—in the making of bags from such material.

One object of the invention is to provide for the forming of each notch in one wall of the tubing while leaving the opposed wall intact.

Another object is to provide for varying the spacing of the notches, thereby accommodating the apparatus to the production of bags of various lengths.

Another object of my invention is to provide for continuous and automatic operation.

The apparatus of this invention is usable on seamed or on seamless tubing with equal facility.

In general, the present invention provides an apparatus in which the walls of the tubing, at a predetermined point in the travel of the tubing, are spread apart, and, while in this condition, an incision is made in one tubing wall. Later on the tubing is severed transversely along a line intersecting the ends of the incision, thereby completing the formation of the notch.

In practice I prefer to effect separation of the tubing walls by introducing air or other gas under a slight pressure between the walls of the tubing at the point or area where the tubing is to be incised, or I may employ a mechanical spreader for the purpose, but in all cases I avoid the use of an anvil against which the initial notch incision is made.

The tool employed for making the notch incisions may take various forms, depending upon the desired shape of the notch, but in all instances this tool is adjustable so as to adapt the apparatus for the production of notched bags of different lengths.

Furthermore, the incision tool may be in the form of a knife the edge of which is shaped to conform to the shape of the incisions to be made; or I may use an electrically heated wire for this purpose. In this connection I have found that a wire wound in a helix and bent to the desired shape produces an incision in which the edge of the notch is beaded. This is of advantage in that it, in a sense, reinforces the edge of the notch and increases its tear resistance somewhat.

In the accompanying drawings,

Fig. 1 is an isometric view of my improved apparatus;

Fig. 2 is a fragmentary view showing means differing from that illustrated in Fig. 1 for separating the tubing walls;

Fig. 3 is a view showing an electrically heated wire, which may be employed in producing the notch incisions in one wall of the tubing; and Fig. 4 is a plan view of a completed thumb notch bag.

Referring to the drawings in detail, 2 designates a shaft carrying a supply roll 4 of thin plastic tubing 6, such as polyethylene, for example. I have shown extruded tubing, but my apparatus is adapted to handle seamed tubing equally well.

The tubing 6 is continuously drawn from the supply roll and continuously advanced by a pair of draw and forwarding rollers 8 and 10. These rollers are geared to each other one-to-one and may be driven by a variable speed motor (not shown) or other conventional variable speed drive so as to vary the linear speed of the tubing 6 whenever any change is to be made in bag lengths.

In passing from the supply roll to the draw rollers, the tubing passes under and over widely spaced guide rollers 12 and 14. Means are provided at 16 for bodily lateral adjustment of the guide roller 12.

Forward of the draw and forwarding rollers 8 and 10 I provide driven cut-off rollers 18 and 20. These rollers are geared together one-to-one and run at constant speed. The roller 18 carries the cut-off blade shown at 22. The roller 20 is smooth-faced and, of course, functions as an anvil.

In practice the tubing is heat-sealed transversely, as seen at 24, in its passage from the draw rollers to the cut-off. As this is conventional practice, I have eliminated any showing of the sealing apparatus.

Adjacent the lower guide roller 12, at the face of the tubing opposite the face which engages the roller, I provide a shaft 26. which extends parallel to the roller 12 and, hence, parallel to the tubing face. This shaft 26, which I shall call a cutter shaft, is driven from the cut-off roller 20 and at the same peripheral speed through chain 28 and sprockets 21 and 27. The cutter shaft 26, which carries the sprocket 27, is angularly adjustable relatively to the sprocket, the sprocket being merely locked to the shaft by a set screw s.

Mounted adjustably in or on the shaft 26 is an incising tool or cutter 29. This tool projects radially from the shaft 26 and is capable, as shown, of being adjusted radially of the shaft, so as to vary its peripheral speed without varying its revolutions per minute.

At a convenient location above the cutter shaft 26 and at the same face of the tubing 6 as the cutter shaft I mount an air nozzle 30, facing the tubing. Air under slight pressure may be supplied from any suitable source.

In practice, the tubing 6 is first threaded through the machine, and then, upon starting a run, the tubing 6 will be drawn from the supply roll 4 and advanced at whatever speed the draw rollers 8 and 10 have been set for. An incision is then made by hand in the wall of the tubing 6 just below or abreast of the end of the air nozzle 30. This will permit air from the nozzle to pass through the tubing wall 32 into the space between the two walls, and, inasmuch as this space is sealed at the ends by the tension on the tubing as it passes about the rollers 12 and 14, the air pressure will separate the tubing walls from each other.

As the incising tool or cutter 29 is revolved by shaft 26, it intermittently engages the wall 32 of the traveling tubing, and each time it engages this wall, it will make an incision therein, such as seen at 34. It will be appreciated that it is desirable that the tool 29 should engage the wall 32 of the tubing at substantially right angles to the plane of the wall. It is for this reason that the adjustment 16 for the roller 12 has been provided in that, by bodily adjusting the roller laterally, the proper angular relation can be obtained between the plane of the wall 32 and the cutting edge of the tool 29.

As above pointed out, the incising tool 29 is adjustable radially of the shaft 26. This effects a variation in the peripheral speed of the incising tool without altering its revolutions per minute, so as to conform the peripheral speed of this tool to changes in the linear speed of the tubing 6, it being necessary for the peripheral speed of the tool to be approximately the same as the linear speed of the tubing when the incising tool engages the tubing.

In setting up the machine for a run of bags of a predetermined length, the speed relation between the draw rollers 8 and 10 and the cut-off rollers 18 and 20 is adjusted until the desired length of bag is achieved. If the thumb notches are not in proper position relative to the cut-off knife 22 so that the cut does not intersect the extremities of the notches, it is merely necessary to loosen the set screw s and make an angular adjustment of cutter shaft 26 with respect to sprocket 27 until the notches register properly with the cut-off and then again lock the sprocket to the shaft. The incising tool 29 can then be adjusted radially of the shaft 26 to set its peripheral speed at substantially the linear speed of the tubing.

In Fig. 2 I have shown a mechanical spreader for separating the walls of the tubing at the area where the tubing is to be incised. Like parts in this view have been given reference characters corresponding to those employed in Fig. 1.

In the apparatus of Fig. 2 the tubing 6 is drawn off the supply roll 4 in the same manner as in Fig. 1. However, the air separator of Fig. 1 between the rollers 12 and 14 has been replaced with a separator or spreader composed of web 36 and upper and lower flanges 38 and 39. It will be seen that the web 36 of the spreader projects at 40 beyond the upper end of the spreader or separator and at 42 beyond the lower end of the spreader.

At the upper end of the spreader above the flange 38, I provide two rollers 44 and 46, one at each side of the extension 40. At the lower end of the spreader I provide a pair of similar rollers 48 and 50, one at each side of extension 42.

In setting up this apparatus, the wall 32 of the tubing passes between extension 42 and roller 48, then over the edge of flange 39, upwardly over the edge of flange 38, and then between roller 44 and extension 40 to roller 14. The other wall of the tubing will be similarly threaded at the other side of the spreader or separator. This provides an area between the flanges 38 and 39 where the tubing can be incised successively by the tool 29 without the employment of an anvil or the like.

The incising tool 29 may be in the form of a piece of metal of the proper shape, or it may be a wire bent to the proper shape, as shown in Fig. 1. In Fig. 3 I have shown another type of tool, designated 29¹. This tool is of wire wound in a close helix and curved to shape. The wire is electrically heated. I find that such a tool has some advantages in that, because it is coiled and heated, it produces an incision in which the edge of the incision is fused and beaded and somewhat strengthened, so as to resist tearing of the tubing at the incision.

It will be seen that the above described apparatus provides for incising one wall of the tubing successively without the use of an anvil or like backing. It will be seen also that the tubing is severed at regular intervals along a transverse line intersecting the two ends of each incision 34, so that a piece 52, bounded by the incision and the line of cut-off, is free to fall out, thereby to provide a thumb notch 54 in one wall of the bag thus produced while leaving the other wall intact.

It is to be understood that changes may be made in the details of construction and arrangement of parts above described within the purview of my invention.

What I claim is:

1. The method of successively producing thumb-notched bag lengths from thin, thermoplastic tubing, each notch being confined to one wall of each bag length, the other wall being left intact, which method comprises continuously advancing the tubing lengthwise; progressively temporarily sealing the advancing tubing transversely at areas spaced from each other longitudinally of the tubing; introducing pressure fluid successively through one wall of the tubing between successive sealed areas to inflate the tubing; forming a curved incision in one wall of successive inflated areas; and subsequently severing the tubing transversely into successive bag lengths along a line intersecting the two ends of each curved incision.

2. In apparatus of the class described, the combination of means for continuously forwarding a continuous length of thin, thermoplastic tubing; means for progressively temporarily sealing the tubing transversely at areas spaced from each other longitudinally of the tubing; means for introducing a gaseous pressure medium between the tubing walls intermediate said successive, temporarily sealed areas thereby to effect separation of the tubing walls between said sealed areas; rotatable incising means, having a peripheral speed substantially the same as the linear speed of the advancing tubing, for making a curved incision in one wall of the traveling tubing at successive areas where the tubing walls are separated, while leaving the other wall intact; a cut-off means for subsequently severing the tubing transversely into bag lengths along a line which intersects the two ends of each incision; a cutter shaft driven from said cut-off means and carrying said incising means, said incising means being adjustable radially of said cutter shaft to vary the peripheral speed of the incising means without varying its revolutions per minute, thereby to accommodate the incising means to varying forwarding speeds of the tubing.

3. In apparatus of the class described, the combination of rotary means for continuously forwarding thin thermoplastic tubing; means for progressively temporarily sealing the tubing simultaneously at two areas spaced from each other longitudinally of the tubing; means for introducing a pressure fluid between the walls of the advancing tubing between the temporarily sealed areas to separate the tubing walls; an electrically heated wire helix adapted intermittently to contact one of the tubing walls at said areas, successively to produce curved incisions in said wall while leaving the other wall intact; and a cut-off for thereafter severing the tubing at incision intervals along a line extending transversely of the tubing and intersecting the ends of each incision, said wire helix being adjustable to vary its peripheral speed to accommodate it to varying forwarding speeds of the tubing.

References Cited in the file of this patent

UNITED STATES PATENTS

| | | |
|---|---|---|
| 1,571,983 | Weber | Feb. 9, 1926 |
| 2,542,652 | Freund | Feb. 20, 1951 |